Jan. 20, 1970 J. P. BONGAARTS 3,491,348

BIASED MAGNETIC HEAD SUSPENSION

Filed July 27, 1967 2 Sheets-Sheet 1

INVENTOR
JOHN P. BONGAARTS

BY Charles T. Johnson
ATTORNEY

Jan. 20, 1970 J. P. BONGAARTS 3,491,348
BIASED MAGNETIC HEAD SUSPENSION
Filed July 27, 1967 2 Sheets-Sheet 2

INVENTOR
JOHN P. BONGAARTS
BY Charles A. Johnson
ATTORNEY

United States Patent Office 3,491,348

Patented Jan. 20, 1970

3,491,348

BIASED MAGNETIC HEAD SUSPENSION

John P. Bongaarts, Minneapolis, Minn., assignor to Sperry Rand Corporation, New York, N.Y., a corporation of Delaware Filed July 27, 1967, Ser. No. 656,438
Int. Cl. G11b *5/00;* G01d *15/06, 15/12*
U.S. Cl. 340—174.1 6 Claims

ABSTRACT OF THE DISCLOSURE

An improved magnetic head for use in a magnetic recording system is described. The magnetic head assembly includes at least one magnetic transducer mounted in a supporting head block, where a surface of the head block cooperates with a moving record member surface in a manner such that the entire head assembly flies on the laminar layer of fluid that exists between the surface and the record member. The head assembly is restrained in a cradle that can be raised and lowered. Additionally, an improved bias spring is described for assisting in controlling the angle of attack as the head assembly is lowered into the flying operational position.

BACKGROUND OF THE INVENTION

Field of the invention

This invention relates generally to the field of dynamic magnetic recording and reading wherein a record member, such as a rotatable drum or disc, is provided with a magnetizable surface upon which discrete areas can be so effected as to provide storage of information indicated by the state of the remanent magnetization. Magnetic transducers are utilized to both record magnetically on the record surface and to read mangetically from the record surface. More specifically, this invention relates to a dynamic magnetic apparatus wherein the magnetic transducers are positioned for cooperation with the magnetizable surface and are supported by the laminar boundary layer of fluid caused by the movement of the record member. The structure for mounting the transducer assembly in a supporting cradle provides an improved operation during positioning of the structure in the flying position by including an improved biasing assembly for determining the angle of attack between the head structure and the recording surface. The improved biasing assembly provides for ease of maintenance of the head assembly.

Description of the prior art

Several prior art systems have provided movable magnetic record surfaces with which magnetic transducers, often referred to as read/write heads, are associated. The prior art has further shown various systems for floating the heads on a laminar layer of fluid, such as air, caused by the rapid movement of the record member surface. The latter systems are often referred to as flying-head memory systems. It is well known that this laminar layer exerts forces on the head structure. The advantages of the flying head arrangement is well documented in the prior art and may generally be stated to be a desirable system for maintaining an extremely small air gap spacing between the read/write head and the surface of the movable record medium. It can generally be stated that the closer the spacing of the read/write head to the surface of the record medium the more efficient is the reading and recording system. Characteristically, this spacing may be in the order of one thousandths of an inch. A further desirable feature, is that the spacing remain constant in operation to achieve desirable constant signal levels during recording and readout. The flying head provides adequately for eccentricity, wobble, and run-out of any of the parts, such as the record medium, as well as for thermal expansion which must be accounted for in any operating system. It has been found that the flying head systems accommodate these problems within operational limits. The prior art includes examples of varying systems for raising and lowering transducer assemblies into the flying position, and include various assemblies for controlling the attitude of the heads as they are lowered into the flying position. Some examples of these devices are illustrated in United States patents issued to F. X. Kanamuller, 3,105,964; R. W. Clarke et al., 3,193,811; and A. K. Baillif, 3,202,974, each of which are assigned to the assignee of this invention. While each of the devices described in the aforementioned patents operate adequately, with regard to affecting the attitude of the head assembly as it is lowered into the flying position, they do not provide as effective means for adjusting the attitude of the head assembly during the lowering operation as does the instant invention. Further, during maintenance and assembly the prior art devices do not provide such simple means for adjustment as does the instant invention. Finally, the instant invention is substantially less expensive to manufacture than any of the prior art devices.

SUMMARY

Briefly, the subject invention comprises a plurality of magnetic transducers mounted in a head block, with the head block movably retained in a head block cradle. The cradle includes a pair of ball mounts for cooperating with a pair of grooves in the head block, whereby the head block can rock about an axis which is substantially parallel to the longitudinal axis of a rotatable magnetic drum. The head block is restrained to the cradle by a pair of spring elements. An additional bias spring member is adapted to be coupled near the leading edge of the head block, with a second coupling to be made to the cradle, whereby the leading edge of the head block is urged away from the surface of the record member, thereby providing an angle of attack. A stop-screw is provided for limiting the amount of movement of the head block. An adjustment screw is also provided or adjusting the amount of tension on the bias spring. As the lowering mechanism moves the head block and cradle assembly toward the moving record member surface, the head block is provided with a predetermined angle of attack, as determined by the bias spring and the stop-screw. At a predetermined position determined by the rate of movement of the record member, the mass of the head block in the cradle assembly, and the tension force of the bias spring, the bias spring is overcome and the assembly is forced into the flying attitude.

An object of this invention then is to provide an improved positioning and suspension mechanism for a flying head assembly. A further object of this invention is to provide an improved biasing assembly for use with a flying head. Another object of this invention is to provide an improved bias spring for controlling the angle of attack of a flying head assembly along with means for adjusting the tension of the bias spring for controlling the angle of attack. These and other objects will become apparent from a detailed consideration of this invention, and it will be seen that the invention provides a substantial improvement over the operation of the prior art while being substantially more economical than any of the prior art systems.

DESCRIPTION OF PREFERRED EMBODIMENT

Figure 1:
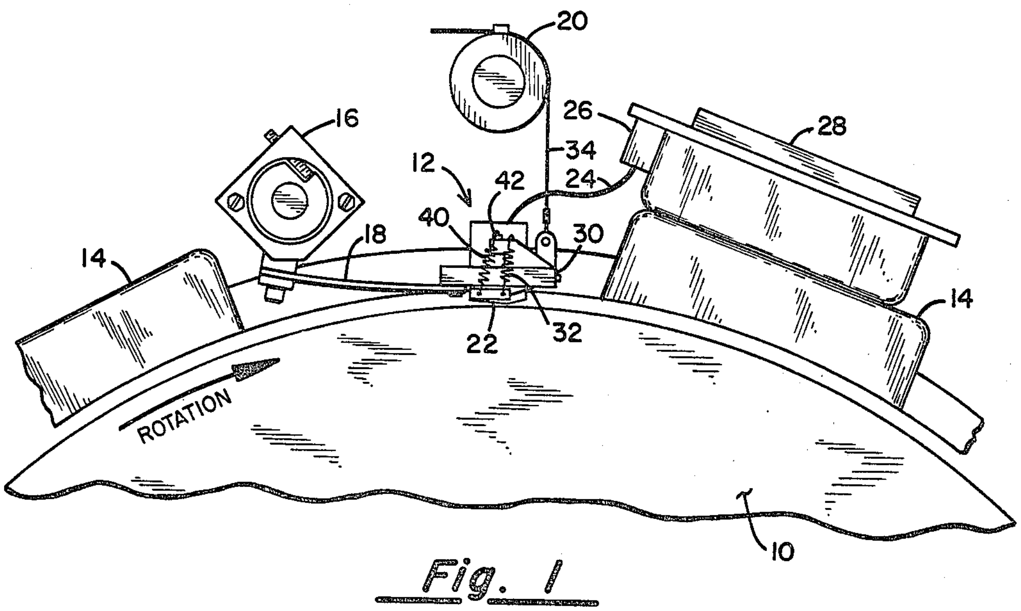
FIGURE 1 is a diagrammatic side view of a single flying head assembly which incorporates the instant invention and illustrates the cooperative relationship of the raising and lowering mechanism, the shroud mount, and the rotatable record member.

FIGURE 1 illustrates in a diagrammatic side view the relationship of a rotatable record member 10, which in this case is a rotatable drum shaped element having magnetizable material coated on the surface thereof, and a supported read/write head structure 12. The drum shroud 14 is supported a predetermined distance from the outer diameter of the magnetic drum 10. The shroud 14 supports the loading block 16. The details of the loading block are set forth in the above identified Baillif patent. Functionally, it operates to exert a predetermined amount of pressure on leaf spring 18 for forcing the read-write head structure 12 toward the surface of the drum. The raising and lowering mechanism 20 is also described by way of example in the Baillif patent, with an alternative raising and lowering mechanism shown in the Clarke et al. patent. The transducers (not shown) supported in the head block 22 are coupled via flexible cable 24 through a connector 26 into circuitry 28. The details of this circuitry will not be discussed, but can comprise reading and writing amplifiers and the appropriately required selection circuitry. The head block 22 is supported in cradle 30 by virtue of spring members 32. A spring, such as that illustrated, exists at the opposite side of the assembly. The cradle is coupled at one end to loading spring 18 and is coupled by cable 34 to the raising and lowering mechanism 20. Bias spring 40 is coupled at one end to the leading edge of the transducer block 22 and is coupled at its other end to adjusting screw 42 which is mounted at the top of cradle 30. Leading edge refers to that portion of the assembly 12 which is first encountered by segment on the drum as it rotates. The trailing edge is at the opposite extremity.

Figure 2:
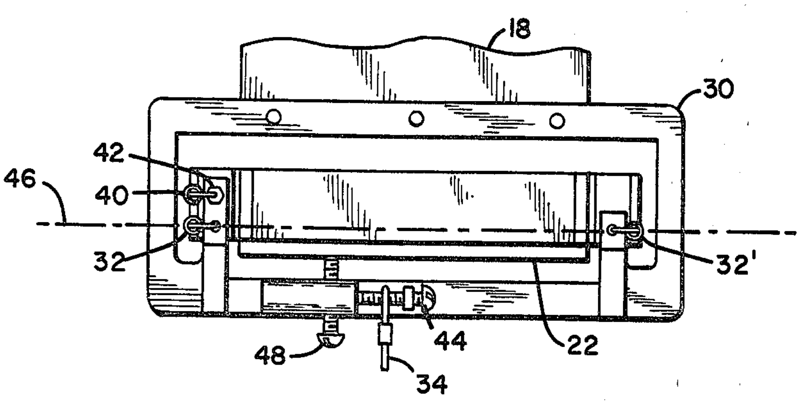
FIGURE 2 is a diagrammatic top view which illustrates the cradle and head block assembly with the bias spring at one side thereof.

Turning now to a consideration of FIGURE 2, which is a diagrammatic view of the cradle and head block assembly, it can be seen that the loading spring 18 is coupled to the leading edge of the cradle 30. The trailing edge of cradle 30 is provided with coupling screw 44 which is utilized to connect to cable 34 for raising and lowering the assembly. The head block 22 is pivotally mounted to be movable about axis 46 in a manner which will be described in more detail below. Spring elements 32 and 32′ couple the head block 22 to the cradle 30. The bias spring 40 is shown coupled to the head block 22 and to the adjustment screw 42. The trailing edge of the cradle 30 is fitted with a stop-screw 48 which extends through the rearward wall and abuts with the trailing edge of the transducer block 22 when the assembly is in the raised position. The operation of the stop-screw 48 will be described in more detail below.

Figure 3A:
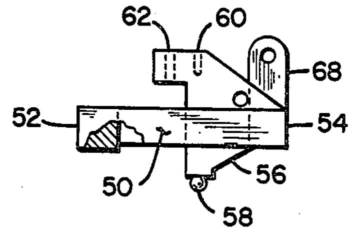
FIGURE 3A is an end elevation view of the head block cradle.
Figure 3B:
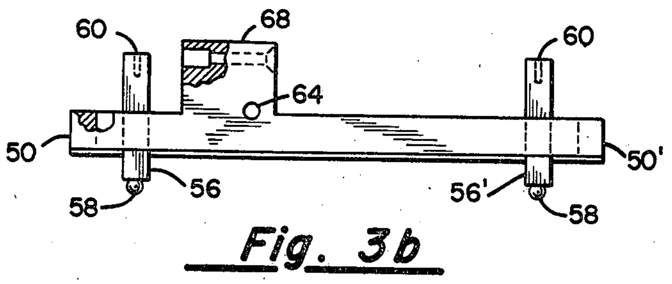
FIGURE 3B is a side elevation view of the head block cradle.
Figure 3C:
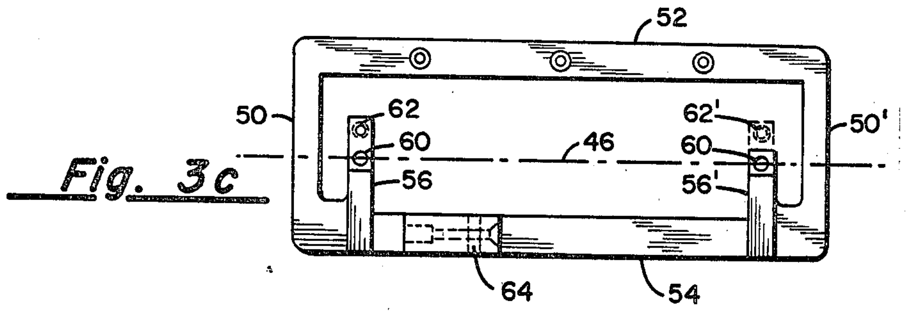
FIGURE 3C is a top view of the head block cradle.

Considering FIGURES 3A, 3B, and 3C together, the structure of the cradle 30 can readily be understood. A pair of side rails 50 and 50′ are utilized to couple together the leading edge 52 and the trailing edge 54. A pair of suspension members 56 and 56′ are mounted to the trailing edge. At the lower extremity of the members 56 and 56′ are pivoting ball members 58 which are adapted to cooperate with grooves in the head block for permitting rotation of the head block about axis 46. The upper extremities of suspension members 56 and 56′ are adapted with spring retaining hole 60. For this embodiment, the suspension member 56 is also provided with a portion holding hole 62. Hole 62 is tapped for receiving adjustment screw 42 to which is mounted one end of the bias spring 40. It is of course evident that if the head block 22 is of sufficient length to require a bias spring at both ends thereof, that supporting member 56′ can be extended in a manner to provide for tapped hole 62′, shown in dashed line, so that a second bias spring can be utilized at the opposite end. The trailing edge 54 is also adapted with hole 64 therethrough for mounting the stop-screw 48. The trailing edge 54 also has mounted thereon portion 68 which operates to connect to cable 34 for providing the raising and lowering operation.

OPERATION

Figures 4A, 4B:
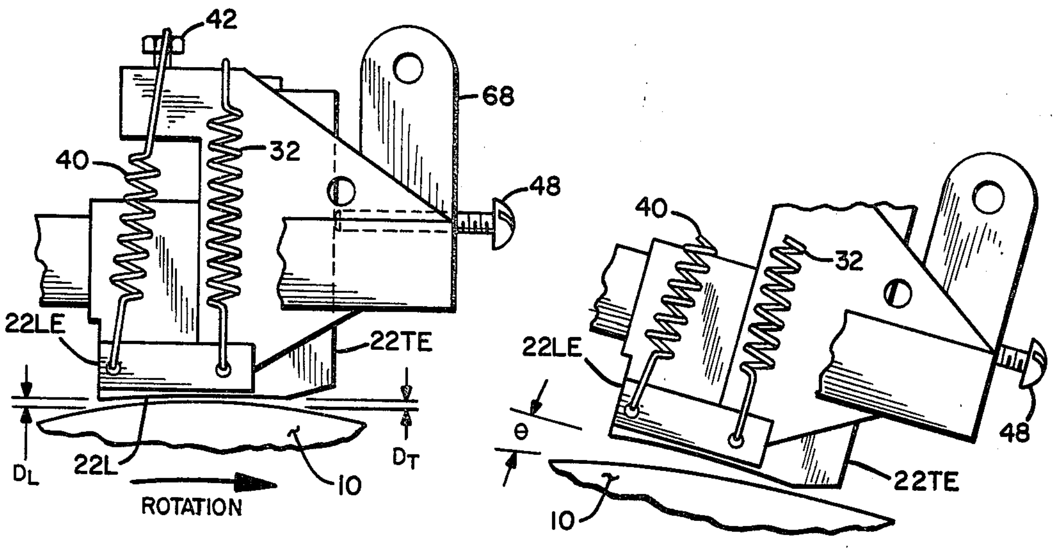
FIGURE 4A is a diagrammatic cutaway view of the head block in the flying position and illustrates the positioning of the bias spring and the bias spring adjustment.
FIGURE 4B is a partial diagrammatic view of the head block assembly shown in the raised position.

Having the detailed structure of the improved head assembly, attention will be directed to FIGURE 4A which is a diagrammatic cutaway view of the head block in a flying position. For use with a rotatable magnetic drum 10, the lower surface 22L is curved to conform to a radius similar to that of the outer surface of the drum 10. In the flying position, the leading edge 22LE has a spacing DL from the drum surface of approximately 3 thousandths of an inch. The trailing edge 22TE of the head block is sloped upwardly. At the closest spacing portion, the trailing edge has a spacing with regard to this surface of the drum DT of approximately 1 thousandths of an inch. It can be seen therefore, that from the leading edge to the trailing edge there is a wedge shaped area decreasing in the direction of rotation. In the operative or flying position, it can be seen that the stop-screw 48 is not in contact with the trailing edge 22TE. Further, the bias spring 40 which is coupled at its lower end near the leading edge of the head block and at its upper end to the adjustment screw 42, is in an extended position.

Next turning attention to FIGURE 4B, which is a partial diagrammatic view of the head block in the raised position it can be seen that bias spring 40 is in a retracted position and that the trailing edge 22TE is in contact with stop-screw 48. This view is exaggerated to the extent that it illustrates that the bias spring 40 raises the leading edge 22LE when not overcome by the Bernoulli effect when placed in the flying position.

It can be seen that the tension of spring 40 can readily be adjusted by the adjustment of screw 42 by turning it into hole 62, thereby lessening the tension; or by turning in so that it extends further out of hole 62, thereby increasing the tension. The tension on spring 40 in conjunction with the positioning of stop-screw 48 determines the amount of tilt of head block 22 when lifted from the flying position. This amount of tilt with regard to the surface of drum 10 defines the angle of attack $\theta$. By adjusting the tension on spring 40 and by turning set screw 42, the angle of attack $\theta$ can be optimized for the particular head structure.

In order to assemble; or remove head block 22, for repair or replacement, it is merely necessary to unhook springs 32 and bias spring 40. In the prior art, various biasing arrangements were required to be released or removed. In the prior art, it was necessary to go though an elaborate and time consuming series of adjustment of biasing elements to achieve the appropriate operation in achieving the desired angle of attack $\theta$. In this invention, readjustment is virtually eliminated in that it is merely necessary to reinsert bias spring 40, as illustrated in FIGURE 4A, when the retention springs 32 have been replaced and the head structure is ready for operation. Should a different head structure be inserted, it may be necessary to provide a fine adjustment of set-screw 42 to achieve the desired operation.

It can be seen from the foregoing, that the various objects have been achieved by the novel structure described. Though only a single head block assembly has been shown and described, it is clear that multiple head blocks, each incorporating a biasing assembly of the type described can be utilized as is fully set forth in the above identified Baillif patent. Further, though the structure is illustrated as operating with a rotatable magnetic drum, it is clear that it can operate equally as well with a planar rotatable disk. It being understood that suitable modifications will become apparent to those skilled in the art, the described exemplary embodiment has been shown for purposes of illustration only, and it will be understood that the scope of the invention is to be determined from the appended claims.

What is claimed is:

1. In apparatus for boundary fluid support of head members from a relatively moving record surface, an improved mechanism for raising and lowering the head members comprising: head block means having a pair of sides, an upper surface, a leading surface, a trailing surface, and a lower surface adapted to cooperate with the moving record surface, said head block supporting at least one magnetic transducer at said lower surface; cradle means having a pair of side walls and forward and rearward walls, and including suspension means for pivotally mounting said head block within said walls about an axis transverse to the direction of movement of the record surface, said cradle means including adjustable stop means in said rearward wall for cooperating with said trailing surface of said head block means; raising and lowering means coupled to said cradle means for raising said cradle means and lowering said cradle means to a position where said head block means is in a cooperative relation with the moving record surface and supported on the boundary fluid; and a bias means having a first end coupled to said suspension means and a second end coupled to one of said pair of sides of said head block means forward of said axis, said bias means for rotating said head block means until said trailing surface is against said adjustable stop means when said cradle means is in the raised position, thereby defining the angle of attack of said head block means with respect to the moving record surface when said raising and lowering means lowers said head block means toward the moving record surface, the force of the boundary fluid overcoming said bias means when said head block means is lowered to the position for cooperating with the moving record surface.

2. Apparatus as in claim 1 and further including bias adjustment means mounted on said suspension means for adjusting the tension of said bias means, said bias adjustment means including means for coupling to said first end of said bias means.

3. Apparatus as in claim 2 wherein said bias adjustment means comprises threaded set-screw means mounted in a threaded hole in said suspension means, said set-screw means including a spring-end receiving hole in the upper portion thereof for receiving said first end of said bias means.

4. Apparatus as in claim 1 wherein said bias means comprises a helical spring member having a predetermined length arranged for holding said head block means against said adjustable stop means when in the raised position.

5. Apparatus as in claim 1 and further including a second bias means having a first end coupled to said suspension means and a second end coupled to the other one of said pair of sides of said head block means forward of said axis, said second bias means for aiding and balancing said first mentioned bias means.

6. Apparatus as in claim 5 wherein said second bias means comprises a second helical spring member.

References Cited

UNITED STATES PATENTS

| | | | |
|---|---|---|---|
| 2,862,781 | 12/1958 | Baumeister | 340—174.1 |
| 2,961,494 | 11/1960 | Darou | 340—174.1 |
| 3,177,495 | 4/1965 | Felts | 340—174.1 |
| 3,180,944 | 4/1965 | Stover | 340—174.1 |

BERNARD KONICK, Primary Examiner

W. F. WHITE, Assistant Examiner

U.S. Cl. X.R.

179—100.2; 346—74